(12) United States Patent
Rischewski (10) Patent No.: US 6,817,203 B1
(45) Date of Patent: Nov. 16, 2004

(54) DEVICE FOR THE DISCONTINUOUS PRODUCTION OF ICE CREAM

(76) Inventor: Marcus Rischewski, Dieselstrasse 5-7, 75210 Keltrn-Dietlingen (DE)

( * ) Notice: Subject to any disclaimer, the term of this patent is extended or adjusted under 35 U.S.C. 154(b) by 281 days.

(21) Appl. No.: 10/130,716

(22) PCT Filed: Nov. 7, 2000

(86) PCT No.: PCT/DE00/03891

§ 371 (c)(1),
(2), (4) Date: Oct. 7, 2002

(87) PCT Pub. No.: WO01/37676

PCT Pub. Date: May 31, 2001

(30) Foreign Application Priority Data

Nov. 23, 1999 (DE) .......................................... 199 56 201

(51) Int. Cl.$^7$ ................................................ A23G 9/12
(52) U.S. Cl. ............................ 62/303; 62/342; 165/94; 222/387; 366/177; 366/195
(58) Field of Search ......................... 62/303, 343, 342, 62/135, 390, 392; 165/139, 154, 94; 222/229, 235, 386, 387; 366/177, 189, 195, 288; 425/376 R (56) References Cited

U.S. PATENT DOCUMENTS

| | | | |
|---|---|---|---|
| 3,780,536 A | * 12/1973 | Fishman et al. | 62/342 |
| 3,914,956 A | * 10/1975 | Knight, Jr. | 62/343 |
| 3,958,968 A | * 5/1976 | Hosaka | 62/343 |
| 4,265,921 A | 5/1981 | Lermuzeaux | |
| 4,551,026 A | * 11/1985 | Cristante | 366/149 |
| 4,643,583 A | 2/1987 | Cecchini | |
| 4,669,275 A | 6/1987 | Ohgushi et al. | |
| 4,680,944 A | * 7/1987 | Menzel | 62/342 |
| 4,722,198 A | * 2/1988 | Huang | 62/342 |
| 4,736,600 A | * 4/1988 | Brown | 62/342 |
| 4,860,550 A | 8/1989 | Aoki et al. | |
| 4,885,917 A | * 12/1989 | Spector | 62/343 |
| 5,016,446 A | * 5/1991 | Fiedler | 62/342 |
| 5,018,363 A | 5/1991 | Aoki et al. | |
| 5,312,184 A | * 5/1994 | Cocchi | 366/302 |
| 5,505,336 A | * 4/1996 | Montgomery et al. | 222/82 |
| 5,617,734 A | 4/1997 | Chase et al. | |
| 5,706,720 A | * 1/1998 | Goch et al. | 99/455 |
| 5,845,512 A | 12/1998 | Chase et al. | |
| 6,089,747 A | * 7/2000 | Huang | 366/149 |

FOREIGN PATENT DOCUMENTS

| | | |
|---|---|---|
| DE | 198 02 852 | 9/1998 |
| EP | 0 445 396 | 9/1991 |
| EP | 0 495 211 | 7/1992 |
| FR | 2 542 578 | 9/1984 |

OTHER PUBLICATIONS

Patent Abstracts of Japan, vol. 1999, No. 14, JP 11 262361, (1999).
Patent Abstracts of Japan, vol. 015, No. 056, JP 02 286045, (1991).

* cited by examiner

Primary Examiner—William E. Tapolcai
Assistant Examiner—Mohammad M. Ali
(74) Attorney, Agent, or Firm—Browdy and Neimark, PLLC (57) ABSTRACT

The invention relates to a device for the discontinuous production of ice-cream from a liquid mixture. Said device comprises a processing container, in which at least one tool is mounted so that it can rotate and repeatedly apply the liquid mixture to and scrape the latter from the refrigerated interior wall of the processing container, a fill opening for the liquid mixture and a discharge opening for dispensing the ice-cream from the processing container. The longitudinal axis (L-L) of the processing container (10) is inclined at a first acute angle ($\alpha$) in relation to the horizontal (H) and the rotating tool (20) comprises spatulas which are configured and mounted in such a way that they continuously transport the ice-cream mass which forms to the discharge opening (15), lying at the lowest point of the processing container (10).

19 Claims, 7 Drawing Sheets

DEVICE FOR THE DISCONTINUOUS PRODUCTION OF ICE CREAM

BACKGROUND OF THE INVENTION

The invention relates to a device in accordance with the preamble of claim 1, as well as to a method for producing ice cream by means of this device. The known machinery for producing ice cream is employed in connection with commercial ice cream production, for example in ice cream parlors.

The basic principle is the same with all machines: the liquid mixture in the processing container is partially and repeatedly applied to the cooled wall of the processing container by means of a processing tool, is cooled there, frozen, and scraped off again and returned to the not yet frozen liquid mixture; once the entire amount of the liquid mixture has frozen into an ice cream mass of the desired consistency and quality, it is taken from the processing container.

PRIOR ART

A differentiation is made in connection with the known discontinuously operating machines between those which are equipped with a rotating vertical vat with cooled wall surfaces, from which the finished ice cream must be removed by means of a large spatula, and those which have a horizontally placed vat and expel the finished ice cream by means of a processing tool.

DE-U-84 38 146.9 discloses a representative of the first mentioned type with the typical disadvantages: filling and emptying take place from the top of the processing container, which is slightly inclined in respect to the vertical direction, a trained specialist is required for removing the finished ice cream with the spatula, since it is dangerous to remove ice cream from the rotating vat. Characteristic for vertically operating machine are the continuous monitoring of the production process by freezing and extended production times; processing the ice cream and cleaning the vat with hands and lower arms in the very cold moist area leads to known health risks; the advantage of this classic machine type rests in a well-kneaded structure and a very low temperature of the finished ice cream.

Therefore there has been no lack of attempts to achieve a similarly good ice cream quality by means of different structural principles:

DE-OS 33 07 016 discloses a device in accordance with the species, wherein the processing container is horizontally arranged, with this device the longitudinal axis of the cylindrical container I extends horizontally. The manipulating end of the device is closed off by a cover, in which a filling funnel for introducing the liquid mixture and a removal opening for removing the finished ice cream are located. The tools for processing the liquid mixture are embodied in several parts: a rotating element is used for coating the wall of the processing container with the liquid mixture, an also rotating kneading and ejecting element, which additionally moves axially back and forth in the longitudinal axis of the processing container, is used for kneading the ice cream mass being formed by means of scraping elements, for the permanent scraping off of the liquid mixture applied to the inner wall, and finally for ejecting the finished ice cream through the removal opening. With this machine with the horizontal processing container, processing of the liquid mixture is performed at a low number of revolutions, for ejecting the finished ice cream the number of revolutions is increased in order to speed up this process and to prevent thawing effects. However, ice cream of unsatisfactory quality is produced with this device since, because of the narrow diameter of the processing container and the comparatively quite high rotational speed it has little time to freeze on the wall of the processing container, with this machine it must not freeze too solidly in order to still convey the ice cream out from the rear to the front through the removal opening of the processing vat at a high number of revolutions by means of the ejection element.

Because of the high ejection speed and the narrow cross section of the removal opening, frictional heat is conveyed to the frozen mass of ice cream, which heats the ice cream mass and begins to degrade the structure and the texture of the ice cream; emptying of the processing container is only incomplete. Finally the structure of the device in accordance with the species is very expensive in comparison with the not completely satisfactory results.

EP 0 495 211 A1, which defines the species, discloses a multi-purpose device which can also be used for the discontinuous preparation of ice cream, wherein the processing container is horizontally arranged. At the manipulation end, the device is closed by means of a cover in which a filling funnel for introducing the liquid mixture and a closeable removal opening for taking out the finished ice cream are located. The tools for processing the liquid mixture consist of an agitator with three spatulas. Because of their construction with many components, the known ice cream machines require a large cleaning outlay, since many joints, open edges and seals (for example a fixedly attached run-off plate) exist, which come into direct contact with the ice cream. They therefore constitute a good culture medium for dangerous bacteria, for example salmonella. For this reason the known machines are questionable in regard to sanitation, since the required outlay for cleaning, even if it can be performed at all, is not always applied for lack of time. The employment of suitable chemicals for cleaning is not desirable for sanitary and ecological reasons. The reception of the finished ice cream following the delivery from the removal opening is also not satisfactorily solved in connection with the known machines.

Most commercially available customary ice cream machines only have a vat receptacle, on which the vat is placed loosely (the bottoms of ice cream vats are always curved), and in most cases too low, on an unsanitary rubber support; one hand is always needed to fix the vat in a position suitable for introducing the finished ice cream, and to maintain it there. These work processes are arduous and endanger the health of the operators.

No manufacturer offers a practical solution at this time in regard to the coarse additives, which are added to certain types of ice cream during their removal.

DESCRIPTION OF THE INVENTION

It is the object of the invention to further develop the device in accordance with the invention in such a way that an improvement of the quality of the ice cream can be achieved. In accordance with the invention, this object is attained by means of the characteristics of claim 1.

The basic concept of the invention consists in the combined effect of the inclination of the processing container and of the tools, which operate exclusively in a rotating manner and therefore can be employed for processing the liquid mixture into ice cream, as well as for ejecting the finished ice cream.

Advantageous embodiments of the attainment of the object in accordance with the invention can be taken from the dependent claims.

BRIEF DESCRIPTION OF THE DRAWINGS

A preferred exemplary embodiment of the device in accordance with the invention will now be explained in greater detail by means of the drawings, shown are in.

DESCRIPTION OF THE PREFERRED EXEMPLARY EMBODIMENT

Figure 1:
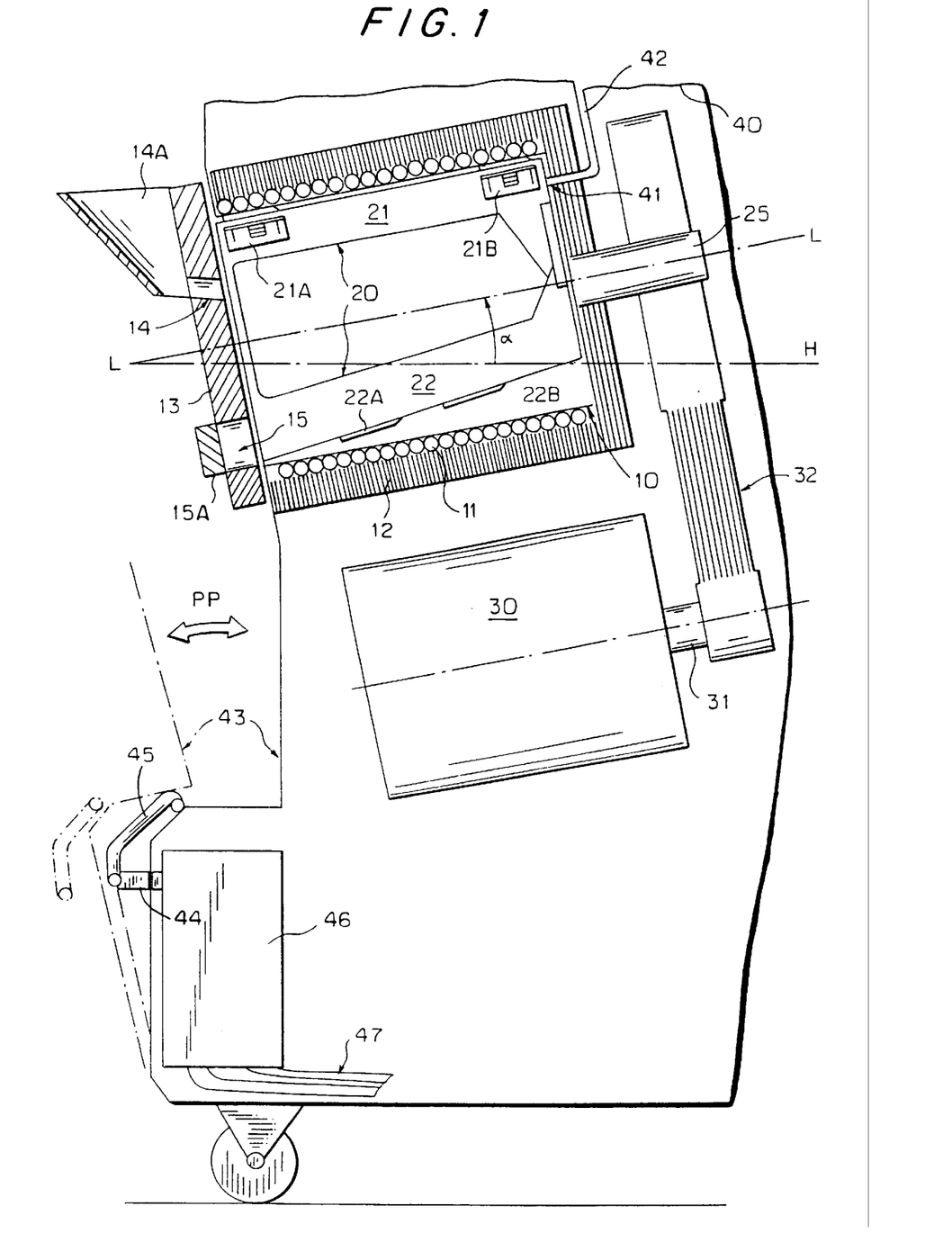
FIG. 1: a schematic longitudinal section through the device.

FIG. 1 shows the essential components of a device for producing ice cream in accordance with the invention; a processing container 10, preferably made of special steel, is maintained, preferably welded, in a housing 40 in such a way that its longitudinal axis L-L forms an acute angle α. of approximately 20° with a horizontal line. A tool 20, whose driveshaft 25 is connected by means of a belt drive 32 with the motor shaft 31 of a motor 30, rotates around the longitudinal axis L-L inside this cylindrical processing container 10. In the exemplary embodiment represented, the belt drive 32 causes a reduction of the number of revolutions of the motor, approximately at a ratio 1 to 5.

The tool 20 can be inserted into the driveshaft 25 from the direction of the open side of the processing container 10 and can be easily removed, for example for cleaning purposes.

A front plate 43, through which all switching devices of the device are accessible, is located underneath the processing container 10 at the front of the housing 40.

The switching devices are housed in a switchbox 46, from where control and supply cables 47 are distributed to the corresponding components inside the housing 40. The switchbox 46 is maintained on the inside of the front plate 43, which can be pivoted forward (two-headed arrow PP in FIG. 1). In this way the switchbox 46 is easily accessible for repair or inspection purposes. A safety chain (not represented) limits the opening angle of the front plate 43 to a maximum of 90°. It is then also possible, if needed, to unhinge the front plate 43 and place it on the floor, together with the switchbox 46.

The processing container 10 is enclosed in a cooling arrangement consisting of cooling coils 11 and an insulation 12 extending over them, as schematically represented in the drawing figures.

A device for charging the outer wall of the processing container 10 with heating gas for cleaning purposes is provided, as well as at least one injection nozzle 41 into the processing container 10 for injecting a cleaning fluid from a line 42 into the interior of the processing container 10.

The downward pointing open side of the processing container 10 can be closed off by means of a self-clamping cover 13. A removal opening 15 has been cut into the lower end of the cover 13, and a fill opening 14 into its upper area. A rotation of the tool 20 is only possible with the cover 13 closed and the fill opening 14 closed, since otherwise the electrical current supply of the motor 30 is blocked by a contact element. By means of this it is assured that manual access into the processing container 10 can only take place when the tool 20 is stopped.

An emergency stop switch 44 is arranged as an additional safety element in the lower front plate 43, which forms the front panel of the housing 40, which inactivates the motor 30 if operational malfunctions, which require a rapid intervention, are detected by the operators. In order to increase the speed and dependability of reaction, a trigger strap 45 extends horizontally above the emergency stop switch 44 over the entire width of the front plate 43, so that the trigger strap 45, which is located at knee height, can be rapidly actuated in every work position.

Figure 5:
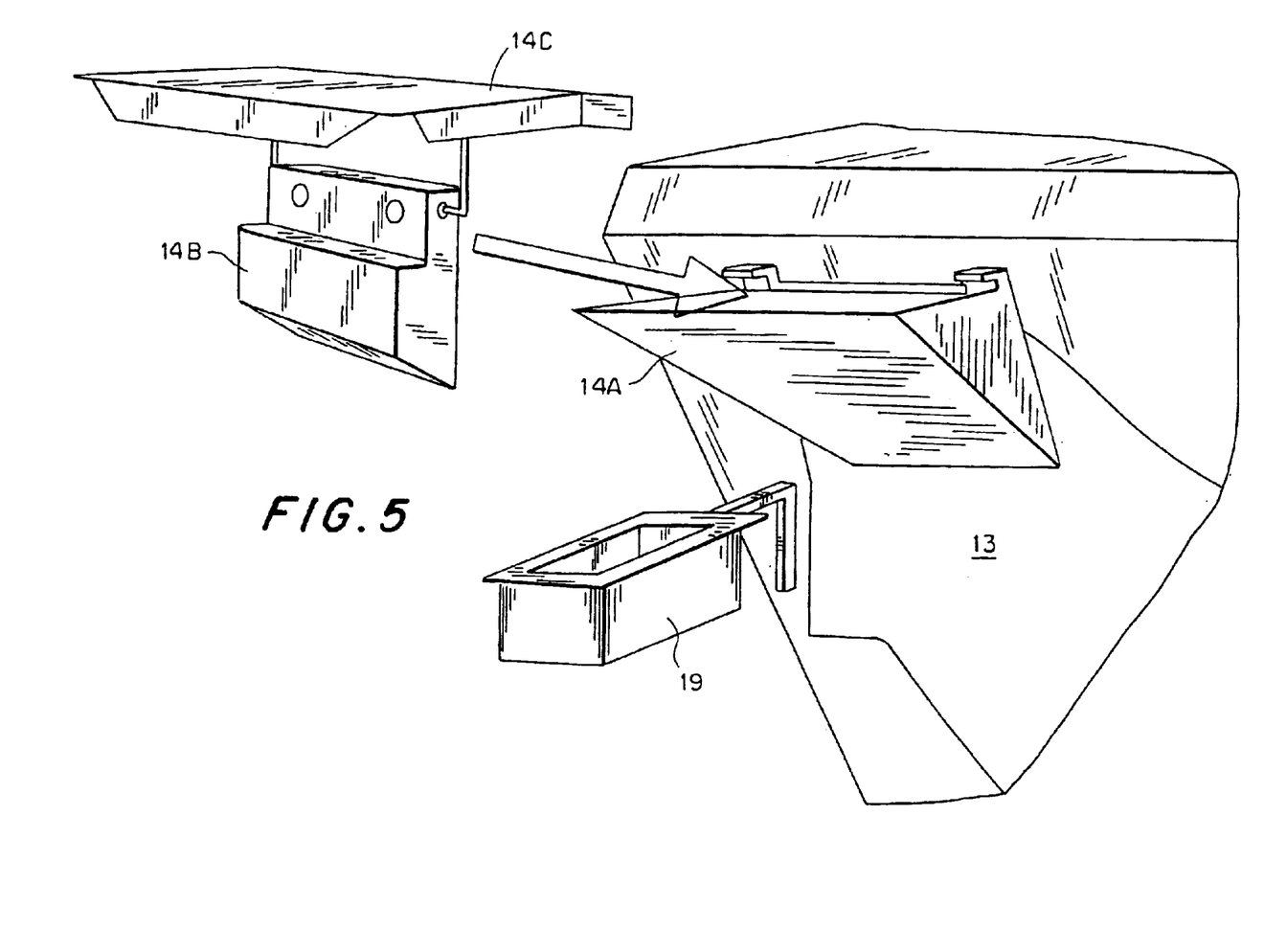
FIG. 5: a perspective representation of the funnel and its closure element.

A funnel 14A for introducing the liquid mixture to be frozen is provided in the fill opening 14. The funnel 14A is preferably welded on and therefore constitutes an integral part of the cover 13. A plug 14B, which is introduced by means of a funnel cover 14C into the funnel 14A, is used as the closure element of the funnel 14A, and in this way blocks the fill opening 14 by clamping (FIG. 5). A container 14D for ingredients is maintained next to the funnel 14A and is used for receiving, for example, chocolate sprinkles, cracknel, or the like.

Figure 6:
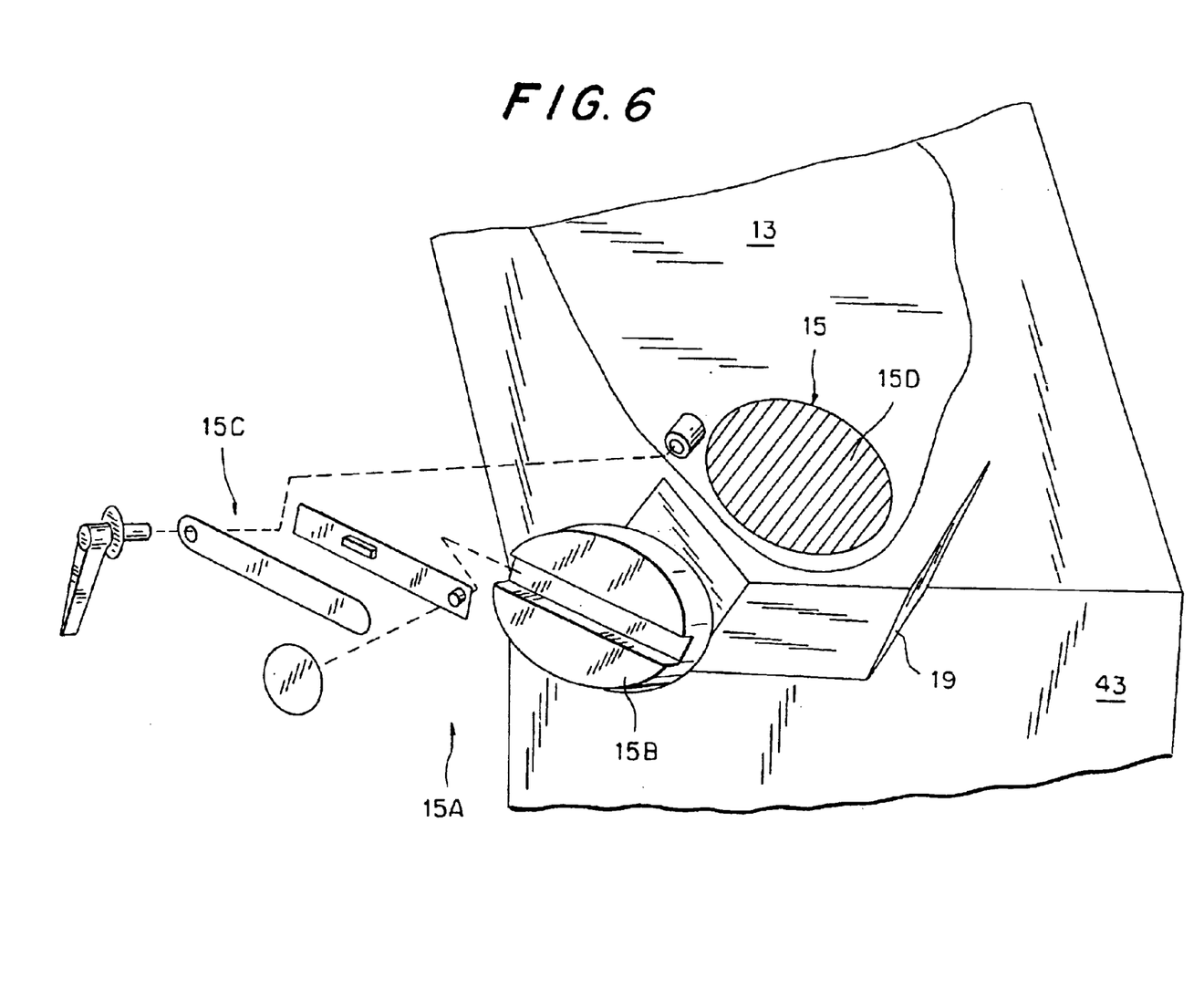
FIG. 6: a perspective representation of the removal opening and its closure element.

The removal opening 15 can be closed off with the closure element 15A represented in FIG. 6 and, for safety reasons, has the customary shutter-like grid 15D in its cross section, through which the finished frozen ice cream is delivered to the exterior. The closure element 15A for the removal opening 15 consists of a closure plate 15B with a toggle fastener 15C, represented in an exploded view in FIG. 6.

In the exemplary embodiment represented, wherein the processing container 10 has a diameter of approximately 30 cm, the cross section of the removal opening 15 is approximately 150 cm², a value which lies considerably above the values so far used in devices of the prior art, and which makes an essential contribution to the increase of the quality of the ice cream.

Figure 4A:
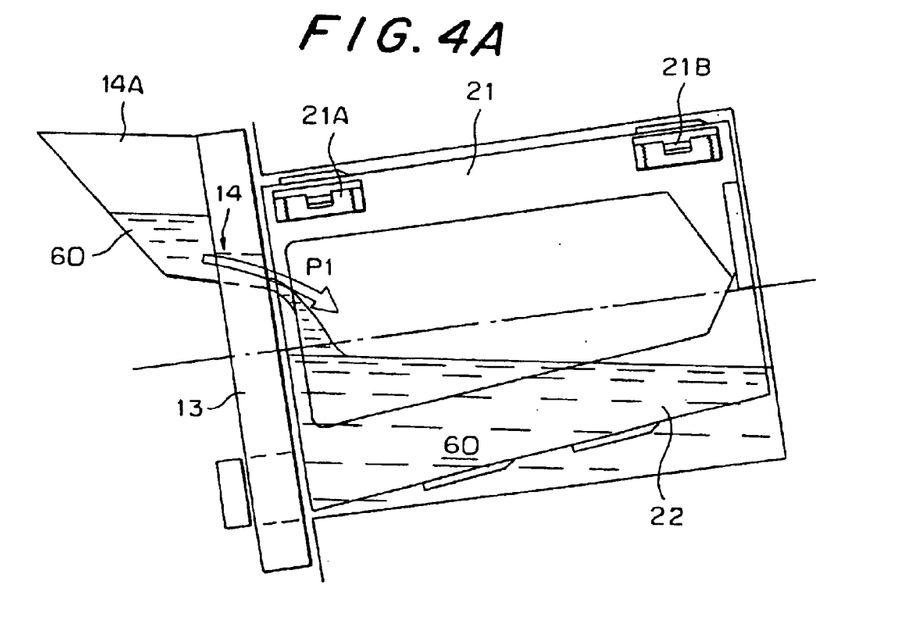
FIGS. 4A to 4C: longitudinal sections through the processing container in the course of various processing stages.
Figure 4B:
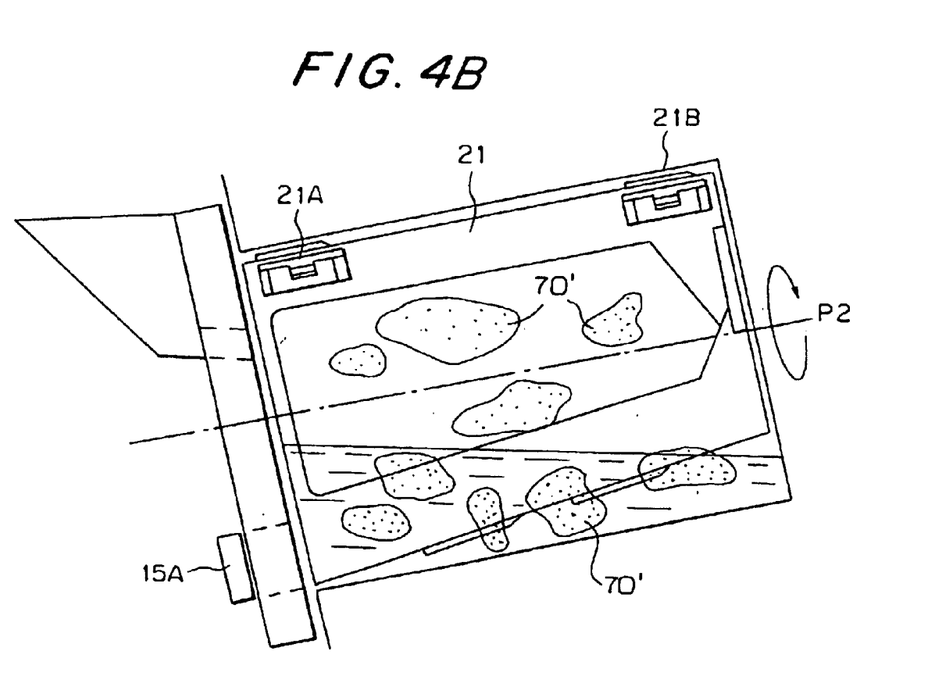
Figure 4C:
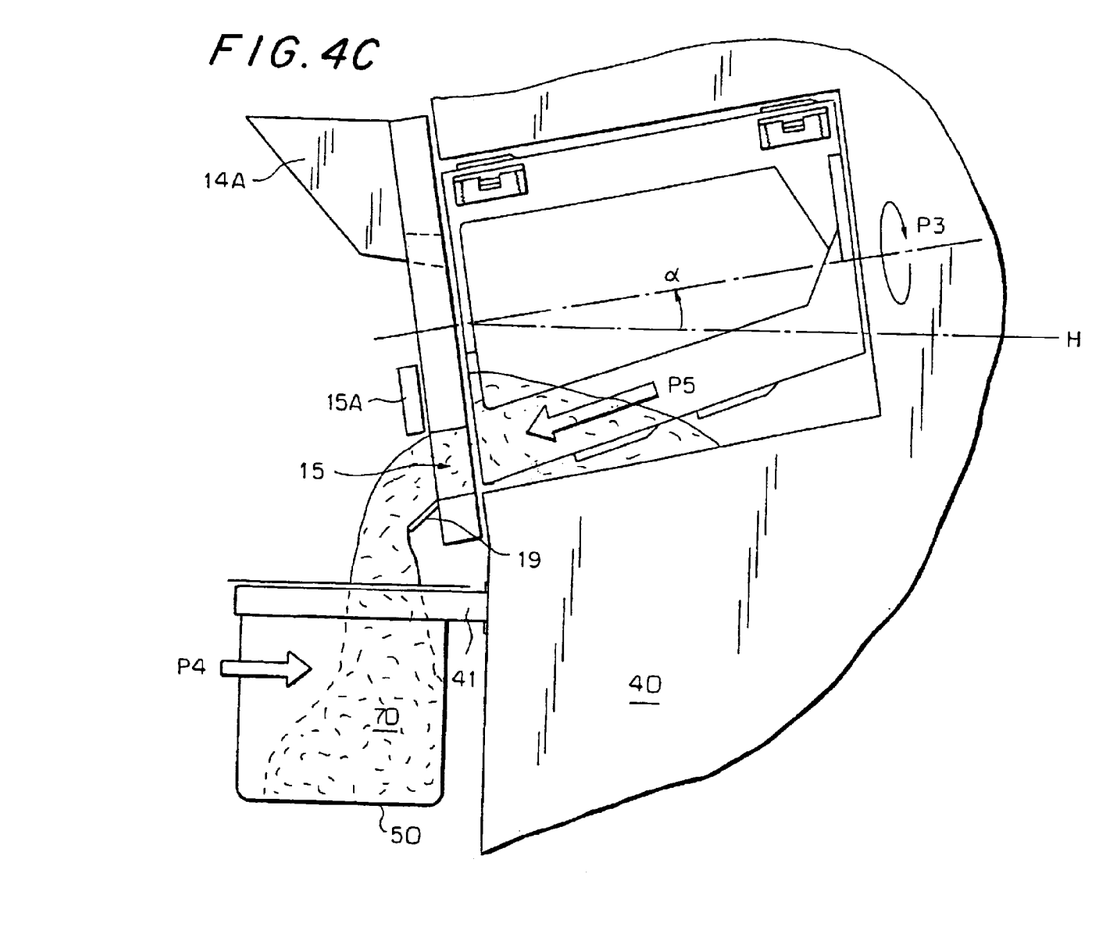

Two parallel support arms 41, 42 are maintained below the removal opening 15 at adjustable distances, between which a receiving container 50 for the finished ice cream can be inserted (FIG. 4C).

Moreover, a removable delivery plate 19 with laterally raised splatter protection plates is provided between the removal opening 15 and the receiving container 50 (FIGS. 4C and 6). In the inserted state, the delivery plate 19 also provides a securing for the front plate 43.

Figure 2:
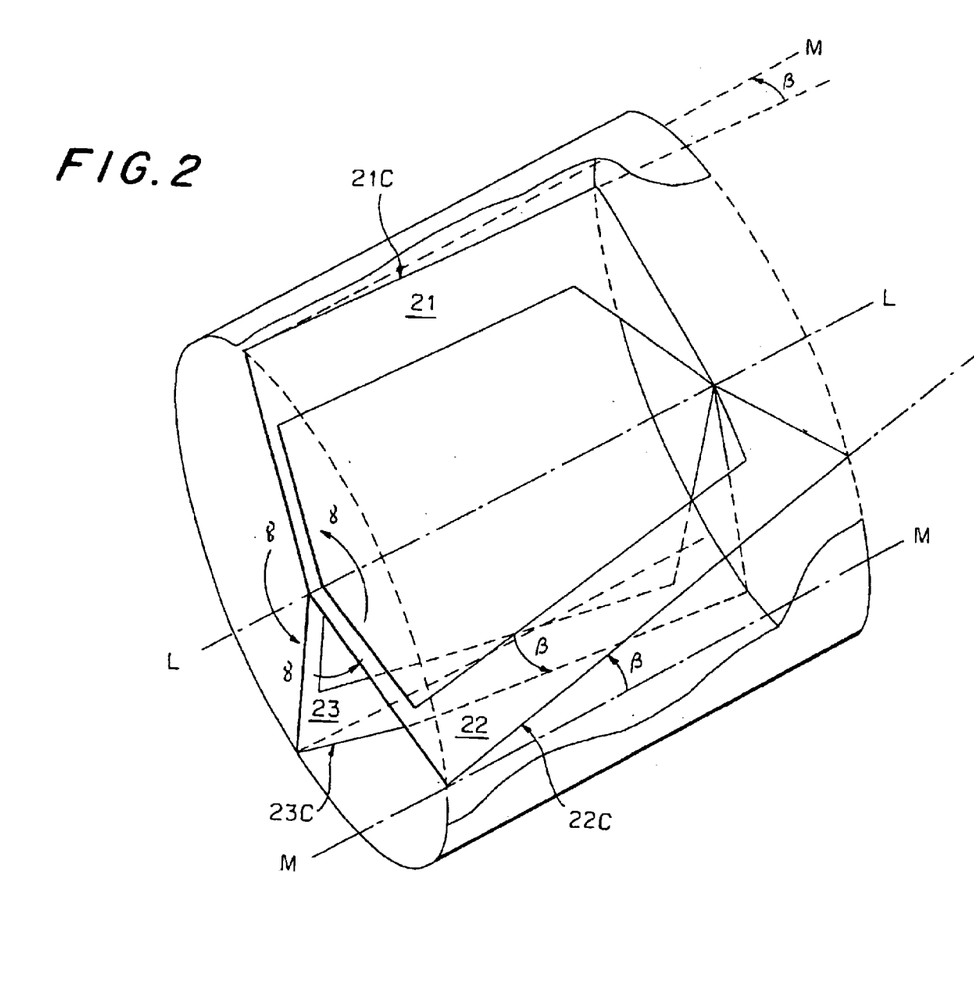
FIG. 2: a partially cut, perspective representation of the processing container of the device.

In the exemplary embodiment represented, the tool 20 consists of three spatulas 21, 22 and 23 embodied in a U-shape, which are offset in respect to each other by a circumferential angle τ=120°, so that the spatial structure represented in FIG. 2 is created. While the bases of the spatulas 21 . . . 23 are maintained on the extension (not represented) of the driveshaft 25 in the interior of the processing container 10, the spatulas themselves are turned in such a way that their respective front faces 21C, 22C, 23C form a second acute angle β with a generating line M—M (FIG. 2) extending parallel with the longitudinal axis L-L.

Figure 3:
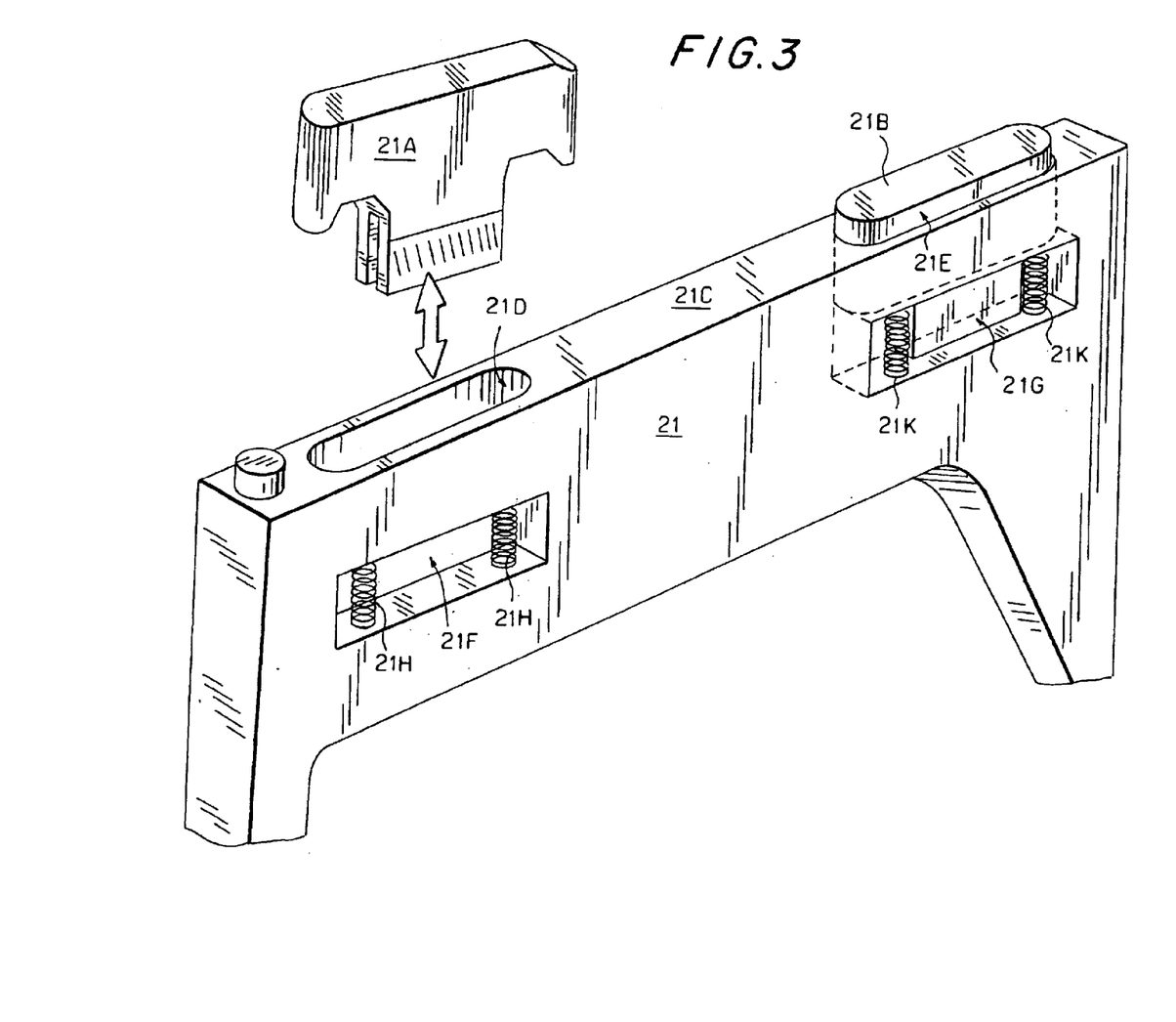
FIG. 3: a partial perspective view of a spatula in the processing container.

The detailed structure of the spatulas can be taken from FIG. 3.

The end of the spatula 21, represented there by way of example (with a correspondingly identical design of the other two spatulas 22 and 23), which faces the inner surface of the processing container 10, is embodied to be plate-shaped, wherein two channels 21D, 21E have been cut into the front face 21C, each of which terminates in an associated lateral opening 21F, 21G. A stripper 21A, 21B can be placed into each one of these channels 21D, 21E, so that a radial displacement of these strippers 21A, 21B in relation to the processing container 10 can take place by the effect of springs 21H . . . 21K, i.e. the strippers are pressed against the inner wall of the processing container.

In this case the lower end of the strippers 21A . . . is embodied to be fork-shaped in such a way that the leg pointing toward the respective opening 21F is accessible from the exterior, so that by means of an action on this leg the removal of the strippers out of their associated shaft, for example for cleaning purposes or for replacing defective parts, can be performed very simply and rapidly by means of the solution of the invention.

The mode of operation of the device of the invention will now first be represented by means of FIGS. 4A to 4C:

For introducing a fluid mixture 60, which was prepared in accordance with the properties of the resulting ice cream, the intended amount of the liquid mixture 60 is introduced into the funnel 14A, which is represented in FIG. 4A (arrow P1). During the filling process the spatulas 21 . . . 23 are stationary because of the removed cover 13. A level of the liquid mixture 60 as approximately represented in FIG. 4A, results in the processing container 10. After the complete introduction of the liquid mixture 60, the fill opening 14 is closed by means of the plug 14B.

The processing of the liquid mixture 60 into an ice cream mass 70 now starts, as schematically represented in FIG. 4B: with the spatulas 21 . . . 23 rotating (rotation arrow P2) at a relatively low rotary speed of 143 rpm, the spatula surfaces pick up the liquid mixture 60 and spread portions thereof on the cooled inner surface of the processing container 10, to which the liquid mixture freezes and forms frozen surfaces 70', which are also shown in dotted lines in FIG. 4B. With each rotation of the tool with the spatulas with the integrated strippers, these frozen-on sections 70' of the ice cream mass 70 are successively removed again from the inner surface of the processing container 10 and in this way get back into the not yet frozen mass of the liquid mixture 60, so that in the length of the processing time the liquid mixture 60 is increasingly converted into the desired amount of ice cream mass 70, wherein the described process "spreading on/scraping off" is repeated several times until an ice cream mass 70 of the desired consistency and quality (particularly in respect to a constant temperature) has been obtained. With the relatively large diameter of 30 cm of the processing container 10, the number of spatulas and their speed of revolution of 142 rpm, a minimum dwell time of the liquid mixture 60 at the inner wall of the processing container of approximately 0.42 sec. results, which assures good freezing adhesion and freezing through.

Here it is already of importance that, because of the inclination of the spatulas by the second acute angle $\beta$, a movement component is created which assures that in the course of scraping the frozen portion 70' from the inner wall of the processing container 10, the latter falls back into the part pointing toward the removal opening 15 because of the effects of gravity, where the still existing rest of the liquid mixture 60 with the already frozen ice cream mass 70 contained therein is collected.

When this processing strip has ended, i.e. the actual production of ice cream, the closure element 15A is opened and the speed of rotation of the spatula 21 . . . is increased, preferably to a value of approximately 288 rpm, which is intended to be expressed by the two-headed arrow P3.

In the course of this the further important function of the inclination of the spatula by the second acute angle $\beta$ appears, namely the generation of a thrust component on the finished ice cream mass 70 (which is indicated by dotted lines in FIGS. 4 in contrast to the liquid mixture 60 indicated by shading). Because of the size of the removal opening 15 on the one hand, and the increased speed of rotation of the spatula on the other hand, the finished ice cream mass is ejected in a short time and practically without remnants out of the processing container 10 into the receiving container 50 (arrow P5), which can then be pulled out of the support arms 41, 42 and inserted into a freezer chest, for example.

It becomes clear from the description of the structure and the mode of functioning of the device in accordance with the invention that with the clever design of the device an almost fully automatic operation from the introduction of the liquid mixture 60 to the removal of the container 50 with the finished ice cream is made possible, wherein the two angles $\alpha$ and $\beta$ are of particular importance. Thus the device in accordance with the invention combines the processing advantage of the horizontally operating machine so far known with the excellent ice cream quality of the vertically operating machines and, with a suitable selection of the numbers of revolutions in accordance with the exemplary embodiment, a very gentle mechanical stress, which preserves the volume and the structure of the ice cream, is obtained in particular, which makes itself known in a long-lasting quality of the ice cream and which can also be put down to the fact that the work of the spatula in the course of ejecting the ice cream is aided by the effects of gravity because of the inclination of the processing container by the first acute angle, because the large-dimensioned removal opening 15 is located at the end of the lowest lying area of the processing container 10.

The represented inclination of the processing container also makes possible further advantageous embodiments, for example the extremely simple cleaning, already mentioned at the outset, by spraying after the vat wall has been heated, wherein for example fresh water automatically sprayed behind the tool can run off again through the removal opening after the cleaning of the inner surface of the processing container 10. Here, too, the joint-free design of the processing container 10 is very helpful, so that the manufacturing outlay required for welding is worth it, since the problem zones of the connection of various components with each other in the area of the processing container, described at the outset, are avoided.

The structural design of the processing area with few welded parts therefore makes an efficient production possible and assures that all sanitary requirements are met.

Further than that, the above described and already largely automated processing actions only require operating steps in a closely limited area, which can be selected in such a way that the operation of the device of the invention can take place in the immediately accessible area of an operator and without bending or stretching and without prolonged holding of loads, so that manipulation is very easy and health concerns of the operator are avoided.

What is claimed is:

1. A device for the discontinuous production of ice cream from a liquid mixture (60), having a processing container (10), the processing container having a cooled inner wall and a longitudinal axis (L-L), evenly spaced spatulas (21, 22, 23) with integrated strippers for the repeated application and scraping off of the liquid mixture from the cooled inner wall of the processing container being rotatably maintained in the processing container, as the processing container further having a fill opening (14) for the liquid mixture and a removal opening (15) for delivering the ice cream (70) from the processing container, characterized in that the longitudinal axis (L-L) of the processing container (10) is inclined by a first acute angle ($\alpha$) in respect to a horizontal line (H), and that the spatulas (21, 22, 23) are designed and held in such a way that their front faces (21C, 22C, 23C) form a second acute angle ($\beta$) with a generating line (M—M) of the processing container (10) extending parallel with the longitudinal axis (L-L), so that they cause a continuous delivery of the frozen portions (70') to the removal opening (15) arranged at the lowest point of the processing container (10) wherein, because of gravity, these portions (70') fall successively back for the inner wall into the part of the processing container (10) pointing toward the removal opening (15), where they are collected with the still existing rest of liquid mixture (60) and are converted into an ice cream mass (70) in the course of the processing time.

2. The device in accordance with claim 1, characterized in that the front faces (21C, 22C, 23C) of the spatulas have at least two strippers (21A . . . ), each of which is maintained in a channel (21D . . . ) and is pressed against the inner wall of the processing container (10) by spring action.

3. The device in accordance with claim 2, characterized in that below each channel (21D . . . ) an opening (21F . . . ) is cut into a lateral face of the spatulas, in which the associated channel (21D . . . ) is conducted, so that the lower end of the associated stripper (21A . . . ) dips into the opening (21F) from above and is maintained there secure against loss.

4. The device in accordance with claim 3, characterized in that the lower end of the strippers (21A . . . ) is embodied fork-shaped in such a way that the leg pointing toward the opening (21F) is accessible from the exterior.

5. The device in accordance with claim 1, characterized in that the cross section of the removal opening (15) is at least 100 cm$^2$.

6. The device in accordance with claim 1, characterized in that two parallel support arms (41, 42) are maintained on the housing (40) at an adjustable distance below the removal opening (15), between which a receiving container (50) for the ice cream (70) can be pushed.

7. The device in accordance with claim 1, characterized in that the first angle ($\alpha$) is approximately 20°.

8. The device in accordance with claim 1, characterized in that the second angle ($\beta$) is approximately 30°.

9. The device in accordance with claim 1, characterized in that the diameter of the processing container (10) is approximately 30 cm.

10. The device in accordance with claim 1, characterized in that the frequency of rotation of the tool (20) can be switched between a first frequency of rotation of preferably 143 rpm for processing the liquid mixture (20), and a second, higher frequency of rotation of preferably 288 rpm for ejecting the finished ice cream mass (70).

11. The device in accordance with claim 1, characterized in that a removable delivery plate (19) is arranged below the removal opening (15).

12. The device in accordance with claim 1, characterized in that a container (14D) for ingredients is arranged in the area of the cover (13).

13. The device in accordance with claim 1, characterized in that devices for heating the processing container (10) and for spraying cleaning fluid into the latter are provided for cleaning purposes.

14. The device in accordance with claim 1, characterized in that a funnel (14A) is welded to the fill opening (14), and that the fill opening (14) can be closed by means of a closure element which is secured against loss.

15. The device in accordance with claim 14, characterized in that the closure element in the funnel (14A) is comprised of a funnel cover (14C) and a plug (14B) attached to it, which is clampingly maintained between the funnel (14A) and the housing (40).

16. The device in accordance with claim 15, characterized in that the motor (30) of the tool (20) is controlled by means of a contact element, which permits the rotation of the tool (20) only when the cover (13) is closed and the fill opening (14) is closed.

17. The device in accordance with claim 1, characterized in that the tool (20) is releasably maintained in the processing container (10) and can be connected with a driveshaft (25).

18. The device in accordance with claim 1, characterized in that the processing container (10) is made of special steel and all components and areas which come into contact with the ice cream are welded together without joints.

19. The device in accordance with claim 1, characterized in that the fill opening (14), the funnel (14A) and its closure element, as well as the removal opening (15) with the closure element (15A), are parts of the cover (13) of the processing container (10).

* * * * *